United States Patent Office 3,629,239
Patented Dec. 21, 1971

3,629,239
PROCESS FOR PREPARING AZIRIDINE DERIVATIVES
Keizo Kitahonoki, Ikoma-gun, and Katsumi Kotera, Michima-gun, Japan, assignors to Shionogi & Co., Ltd., Osaka, Japan
No Drawing. Continuation-in-part of application Ser. No. 510,046, Nov. 26, 1965. This application Sept. 3, 1969, Ser. No. 855,019
Claims priority, application Japan, Nov. 26, 1964, 39/66,755; Aug. 13, 1965, 40/49,466
Int. Cl. C07d 23/02, 23/06, 31/42
U.S. Cl. 260—239 E    6 Claims

ABSTRACT OF THE DISCLOSURE

Novel process for preparing aziridine derivatives which comprises reducing an oxime compound with a metallic hydride complex in an inert solvent.

---

This application is a continuation-in-part of U.S. application Ser. No. 510,046, filed Nov. 26, 1965 and now abandoned.

The present invention relates to novel process for preparing aziridine derivatives. Particularly, this invention relates to a process for reducing an oxime compound to the corresponding aziridine compound. More particularly, it relates to improvements in the preparation of aziridine derivatives.

Aziridine derivatives are important chemical substances owing to considerable use in various branches of science and technology. For instance, aziridine derivatives are useful as working agents in the textile and paper industries, developers of color photographs, insecticides for control of mosquitos, flies, and other blood-sucking insects, tumour growth inhibitors, and rocket fuels. These aziridine derivatives have heretofore been prepared by several methods in accordance with the object of the preparation.

(A) GABRIEL METHOD

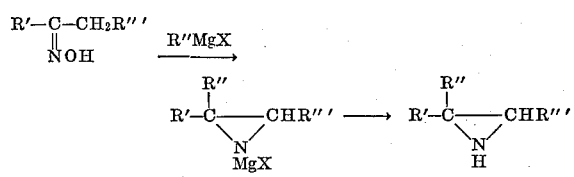

[Ber. vol. 50, p. 804 (1917)].

(B) WENKER METHOD

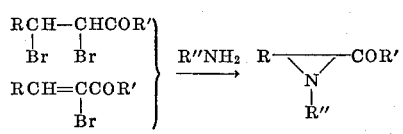

[J. Am. Chem. Soc., vol. 57, 2328 (1935)].

(C) KETOAZIRIDINE METHOD

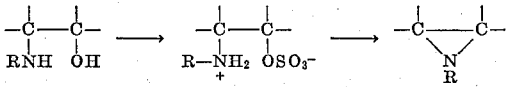

[Cromwell: J. Am. Chem. Soc., vol. 73, 1044 (1951)].

(D) HOCH-CAMPBELL METHOD

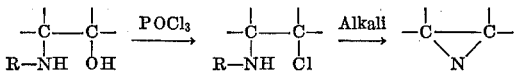

[J. Org. Chem., vol. 4, 198 (1939)].

(E) NEBER METHOD

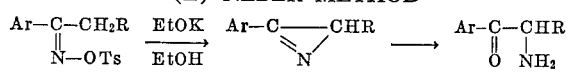

[Ann., vol. 515, 283 (1935)].

However, a limitation in the Gabriel method is the difficulty of obtaining the intermediary chloroamines from highly substituted amino alcohols. The Wenker method has the difficulty of obtaining the starting β-aminoalcohol. By the Hoch-Campbell method, such an aziridine compound having a substituent only at the 2-position of the aziridine ring cannot be prepared owing to the inevitable introduction of an aryl or alkyl group into the aziridine ring. The Neber method only rarely yields the aziridine compound by reducing the unstable intermediary azirine. The ketoaziridine method has the defect of necessarily yielding aziridine compounds having an oxo group. However, the above defects in the known methods have now been overcome by the process of the present invention which can produce aziridine derivatives from commercially available ketoximes in a single step. As another advantage of this invention, the present reaction yields selectively the cis-form aziridine, when there is a possibility of producing the cis and trans forms. Therefore, the present process has been discovered to be a stereospecific reaction.

Accordingly, an object of the present invention is to provide a novel process for producing aziridine derivatives. Another object of this invention is to provide a generic process for reducing an oxime compound to the corresponding aziridine compound. A further object of this invention is to embody an improvement in the production of aziridine derivatives. These and other objects will be apparent to those conversant with the appurtenant art from the following description of the general class of compounds and the several specific examples and methods of obtaining them presented.

The process of the present invention comprises reducing an oxime compound represented by the formula:

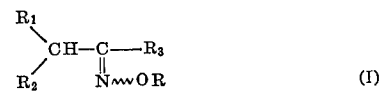

wherein R represents hydrogen, lower alkyl (e.g. methyl, isopropyl, n-pentyl), aryl (e.g. phenyl, tolyl), are(lower) alkyl (e.g. benzyl, phenethyl) or acyl (e.g. acetyl, benzoyl, ethoxycarbonyl, benzenesulfonyl, p-toluenesulfonyl), $R_1$, $R_2$ and $R_3$ represent each hydrogen, alkyl (e.g. actyl isobutyl, methyl, n-pentyl), cycloalkyl (e.g. cyclopentyl, cyclohexyl, cycloheptyl), aryl (e.g. phenyl, tolyl, 1-naphthyl, 2-naphthyl), aralkyl (e.g. benzyl, phenethyl, phenyl-isopropyl), alkenyl (e.g. vinyl, 2-butenyl, allyl), or aralkenyl (e.g. benzylidene, cinnamyl), or two members of R, $R_1$, $R_2$ and $R_3$ form a ring (hereinafter referred to as "the formed ring") possibly having one or more condensed rings or taking one or more ring bridges between two carbon atoms in the ring, said hydrocarbon group defined by R, $R_1$, $R_2$ and $R_3$, the formed ring, the condensed ring and the ring bridge being able to have one or more substituents selected from the group consisting of lower alkyl (e.g. n-propyl, methyl, isobutyl), lower alkoxy (e.g. ethoxy, isopropoxy, methoxy), hydroxyl, lower alkylthio (e.g. ethylthio, methylthio, isopropylthio), halogen (e.g. chlorine, bromine, iodine, fluorine), lower alkylamino (e.g. isopropylamino, methylamino, ethylamino), di(lower)alkylamino (e.g. dimethylamino, diethylamino, di-n-propylamino), and amino and these hydrocarbon group, the formed ring, the condensed ring and the ring bridge possibly containing one or more hetero atoms selected from the group consisting of nitrogen, sulfur, and oxygen, and the ripple mark (⸾) is a generic indication of both syn and anti forms with a metallic hydride complex in an inert solvent to give an aziridine compound represented by the formula:

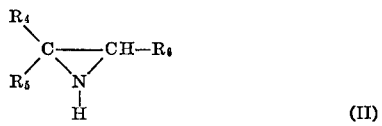

(II)

wherein $R_4$, $R_5$ and $R_6$ represent each hydrogen, alkyl (e.g. octyl, isobutyl, methyl, n-pentyl), cycloalkyl (e.g. cyclopentyl, cyclohexyl, cycloheptyl), aryl (e.g. phenyl, tolyl, naphthyl, phenanthryl), aralkyl (e.g. benzyl, phenethyl, phenylisopropyl), alkenyl (e.g. vinyl, 2-butenyl, allyl), or aralkenyl (e.g. benzylidene, cinnamyl) or two members of $R_4$, $R_5$ and $R_6$ form a ring (hereinafter referred to as "the formed ring") possibly having one or more condensed rings or taking one or more ring bridges between two carbon atoms in the ring, said hydrocarbon group defined by $R_4$, $R_5$ and $R_6$, the formed ring, the condensed ring and the ring bridge being able to have one or more substituents selected from the group consisting of lower alkyl (e.g. n-propyl, methyl, isobutyl), lower alkoxy (e.g. ethoxy, isopropoxy, methoxy), hydroxyl, lower alkylthio (e.g. ethylthio, methylthio, isopropylthio), halogen (e.g. chlorine, bromine, iodine, fluorine), lower alkylamino (e.g. isopropylamino, methylamino, ethylamino), di(lower) alkylamino (e.g. dimethylamino, diethylamino, di-n-propylamino), and amino and these hydrocarbon group, the formed ring, the condensed ring and the ring bridge possibly containing one or more hetero atoms selected from the group consisting of nitrogen, sulfur and oxygen.

The starting material of the present invention involves all the chain and ring type of oxime compounds (i.e. ketoxime and aldoxime) represented by the above Formula I. Examples of the oxime compounds are alkyl aryl ketoxime, alkyl aralkyl ketoxime, aralkyl aryl ketoxime, diaralkyl ketoxime, diaryl ketoxime, $\alpha,\beta$-unsaturated ketoxime, aralkyl aldoxime, alkyl aldoxime, ketoxime of bridged ring system and 2-isoxazoline. Thus, the process of this invention can be applied generally to organic oxime compounds containing heterocyclic, terpenic, norborneyl, steroidal, and alkaloidal nuclei. The substituent defined by R may be combined with hydroxyimino group of the oxime compounds by ethereal bonding or ester bonding. When the ether bonding of the oxime compound is cyclized with inclusion of ether of $R_1$, $R_2$ and $R_3$, there is constituted a formed ring such as 2-isoxazoline. The said starting material involves illustratively;

2-hydroxyimino-1,2,3,4-tetrahydro-1,4-ethano-naphthalene,
2-hydroxyimino-1,2,3,4-tetrahydro-1,4-methano-naphthalene,
1,4-ethano-cyclohexane,
1-methyl-1,4-isopropylidene-2-hydroxyimino-cyclohexane,
2,3-bis(methoxycarbonyl)-9-hydroxyimino-1,2,3,4-tetrahydro-1,4-ethano-naphthalene,
11-hydroxyimino-9,10-dihydro-9,10-ethano-anthracene,
6-hydroxyimino-6,7-dihydro-5H-dibenzo[a,c]cycloheptene,
1-phenyl-2-hydroxyimino-propane,
1,3-diphenyl-2-hydroxyimino-propane,
1,3-diphenyl-2-tosyloxyimino-propane,
1,3-diphenyl-2-acetyloxyimino-propane,
desoxybenzoin oxime,
2-tetralone oxime,
1,3-diphenyl-2-methoxyimino-propane,
1-tetralone oxime,
2-(2-pyridyl)acetophenone oxime,
acetophenone oxime,
4-chloroacetophenone oxime,
4-methoxyacetophenone oxime,
1-(2-naphthyl)-1-hydroxyimino-ethane,
1-(1-naphthyl)-1-hydroxyimino-ethane,
propiophenone oxime,
1-naphthylacetone oxime,
1-(9-phenanthryl)-1-hydroxyimino-ethane,
1-phenyl-2-hydroxyimino-ethane,
1-(4-methoxyphenyl)-2-hydroxyimino-ethane,
1-(4-chlorophenyl)-2-hydroxyimino-ethane,
1,1-diphenylacetone oxime,
chalcone oxime,
1-methyl-1-phenylacetone oxime,
1-ethyl-1-phenylacetone oxime,
10-methoxycarbonyl-7-hydroxyimino-5,6,7,8-tetrahydro-6,9-methano-9H-benzocycloheptene,
6-acetyltetralin oxime,
1-(6-chloro-2-naphthyl)-1-hydroxyimino-ethane,
2-(2-naphthyl)-1-hydroxyimino-ethane,
3,5-diphenyl-2-isoxazoline,
3-phenyl-2-isoxazoline,
benzalacetone oxime,
phenyl vinyl ketoxime,
$\alpha$-phenylchalcone oxime,
phenyl $\alpha$-styryl ketoxime, and
3-methyl-4,5-diphenyl-2-isoxazoline.

This starting oxime compound (I) can be prepared in a per se conventional manner such as by reacting a carbonyl compound with hydroxylamine hydrochloride in the presence of pyridine.

As the metallic hydride complex, there are exemplified lithium aluminum hydride, magnesium aluminum hydride and sodium aluminum hydride. The reduction can be carried out in the range of temperature from 0° C. to the boiling point of the solvent used in an inert solvent such as ether, tetrahydrofuran, diglyme or tetrahydropyran, when needed, in the presence of a basic suitable adjuvant such as tert-pentylamine, n-propylamine, sec-octylamine, diethylamine, N-ethyl-n-propylamine, N-methyl-n-butylamine, pyrrolidine, piperazine, N-methyl-benzylamine or N-ethyl-$\beta$-phenylethylamine. The resultant crude aziridine compound can be purified in a per se conventional separating procedure such as by recrystallization, columnar chromatography, thin layer chromatography, or gas phase chromatography. The thus obtained aziridine compound (II) can be, when required, converted into a suitable derivative such as acylate for the purpose of separation, isolation, purification or manufacture of a medicinal. Examples of the acylating reagent are: isocyanate (e.g. phenylisocyanate, p-nitrophenylisocyanate), isothiocyanate (e.g. p-nitrophenylisothiocyanate), dialkyl pyrocarbonate (e.g. diethyl pyrocarbonate, dimethyl pyrocarbonate), aryloyl halide (e.g. p-nitrobenzoyl chloride, benzoyl chloride) and alkyl phenoxycarbonate (e.g. ethyl p-nitrophenoxycarbonate, methyl 2,4-dinitrophenoxycarbonate). The acylation can be carried out in a per se conventional manner, for instance, in the range of temperature from temperature under cooling to the boiling point of the solvent used in the presence or absence of an inert solvent such as water, alcohols, ether, benzene, toluene, dioxane, diglyme, tetrahydrofuran, or tetrahydropyran. In practice, the reagent and solvent must be selected suitably according to the object of the acylation. Illustrative examples of the acylates in the N-position of the aziridine ring are phenylcarbamoyl compound, p-nitrophenylcarbamoyl compound, phenylthiocarbamoyl compound, p-nitrobenzoyl compound, ethoxycarbonyl compound and methoxycarbonyl compound.

The thus-produced aziridine derivatives (II) involve illustratively;

2,3-imino-1,2,3,4-tetrahydro-1,4-ethano-naphthalene,
2,3-imino-1,2,3,4-tetrahydro-1,4-methano-naphthalene,
2,3-imino-1,4-ethano-cyclohexane,
1-methyl-1,4-isopropylidene-2,3-imino-cyclohexane,
2,3-bis(hydroxymethyl)-9,10-imino-1,2,3,4-tetrahydro-1,4-ethanonaphthalene,
2,3-bis(acetyloxymethyl)-9,10-imino-1,2,3,4-tetrahydro-1,4-ethano-naphthalene,
11,12-imino-9,10-dihydro-9,10-ethano-anthracene, 5,6-imino-6,7-dihydro-5H-dibenzo[a,c]-cycloheptene,
2-methyl-3-phenyl-aziridine,
2-benzyl-3-phenyl-aziridine,
2,3-diphenyl-aziridine,
1,2-iminotetralin,
2-phenyl-3-(2-pyridyl)-aziridine,
2-phenyl-aziridine,
2-(4-chlorophenyl)-aziridine,
2-(4-methoxyphenyl)-aziridine,
2-(2-naphthyl)-aziridine,
2-(1-naphthyl)-aziridine,
2-methyl-3-(1-naphthyl)-aziridine,
2-(9-phenanthryl)-aziridine,
2-methyl-3,3-diphenyl-aziridine,
2-(1-phenylethyl)-aziridine,
2-(1-phenylpropyl)-aziridine,
10-hydroxymethyl-7,8-imino-5,6,7,8-tetrahydro-6,9-methano-9H-benzocycloheptene,
6-(2-aziridinyl)-tetralin,
2-(6-chloro-2-naphthyl)-aziridine,
2-benzyl-3-methyl-aziridine,
2-benzyl-2,3-diphenyl-aziridine,
2-methyl-2,3-diphenyl-aziridine, and
2-benzyl-2-phenyl-3-methyl-aziridine.

The process of this invention has some economical and industrial merits as the preparation of aziridine derivatives.

(a) A generic process for preparing aziridine derivatives which is not accompanied by defects of known methods has been established. Thus, every sort of aziridine derivative can be prepared at discretion.

(b) The starting oxime compound is commercially and synthetically much more available than those of known methods.

(c) The process of this invention proceeds in a single step with simple operations.

(d) When there is a possibility of producing the cis and trans forms of aziridine, the present process yields selectively the cis-form.

Presently-preferred and practical embodiments of the present invention are illustratively shown in the following examples.

Example 1

To a suspension of lithium aluminum hydride (1.9 g.) in tetrahydrofuran (30 ml.), there is added dropwise a solution of 2-hydroxyimino-1,2,3,4-tetrahydro-1,4-ethano-naphthalene (940 mg.) in tetrahydrofuran (26 ml.) with cooling at 8 to 10° C. and with stirring, and the mixture is refluxed for 4 hours. The reaction mixture is chilled below 5° C., mixed with a small amount of water to decompose lithium aluminum hydride and filtered. The insoluble part is washed with ether. The filtrate is combined with the ethereal washings, the mixture is dried over potassium carbonate, and the solvent is evaporated. The residue is dissolved in either (15 ml.) and treated with 5% cold hydrochloric acid (10 ml.). The hydrochloric acid layer is made alkaline with potassium carbonate and shaken with ether. The ethereal layer is dried and the solvent is evaporated to give an oily substance (769 mg.). The oily substance is chromatographed on alumina with a mixture of petroleum ether and benzene (9:1). The eluted crude crystals are recrystallized from a mixture of hexane and ether to give 2,3 - exo-imino-1,2,3,4-tetrahydro-1,4-ethano-naphthalene (395) mg.) as needles melting at 88.5 to 89.5° C.

Other crude crystals obtained from the eluate of the petroluem ether and benzene are recrystallized from petroleum ether and further purified by thin layer chromatography to give 2,3 - endo-imino - 1,2,3,4 - tetrahydro-1,4-ethano-naphthalene (17.7 mg.) as crystals melting at 108 to 110° C.

Example 2

To a suspension of lithium aluminum hydride (866 mg.) in tetrahydrofuran (15 ml.), there is added dropwise a solution of 2-hydroxyimino-1,2,3,4-tetrahydro-1,4-methano-naphthalene (441 mg.) in tetrahydrofuran (6 ml.) in 5 minutes with stirring, and the resultant mixture is refluxed for 5 hours. The reaction mixture is treated similarly to Example 1 to give a yellow oil (353 mg.). The oil is chromatographed on alumina with a mixture of petroluem ether and benzene (9:1) to (1:1) and the eluates are purified by thin layer chromatography to give crude crystals (12 mg.), which are recrystallized from n-hexane to give 2,3-imino-1,2,3,4-tetrahydro-1,4-methano-naphthalene as crystals melting at 98 to 100° C.

Example 3

To a suspension of lithium aluminum hydride (3.045 g.) in tetrahydrofuran (30 ml.), there is added dropwise a solution of 1,4 - ethano - 2 - hydroxyimino-cyclohexane (1.129 g.) in tetrahydrofuran (10 ml.) under stirring, and the resultant mixture is refluxed for 3 hours. The reaction mixture is treated similarly to Example 1 to give crude 2,3-imino-1,4-ethano-cyclohexane as a white solid (820 mg.).

A solution of the crude substance in ether (6 ml.) is added dropwise to a solution of phenylisocyanate (446 mg.) in ether (1 ml.) under ice cooling and with stirring, and the resultant mixture is allowed to stand in a freezer overnight. The precipitated white crystals are purified by recrystallization and alumina chromatography to give N-phenylcarbamoyl - 2,3 - imino-1,4-ethano-cyclohexane (28 mg.) as plates melting at 152 to 153° C.

Example 4

From 1-methyl-1,4-isopropylidene - 2 - hydroxyimino-cyclohexane (8.0 g.), there is similarly obtained crude 1-methyl - 1,4 - isopropylidene-2,3-exo-imino-cyclohexane (2.01 g.) as an oil, which is treated with phenylisocyanate to give 1-methyl - 1,4 - isopropylidene - N - phenylcarbato give 1-methyl-1,4-isopropylidene - N - phenylcarbamoyl-2,3-exo-imino-cyclohexane as plates melting at 137 to 139° C.

Example 5

From 2-syn,3-syn-bis(methoxycarbonyl) - 9 - hydroxyimino - 1,2,3,4 - tetrahydro-1,4-ethano-naphthalene (1.364 g.), there is similarly obtained 2-syn,3-syn-bis(hydroxymethyl)-9,10-anti-imino-1,2,3,4-tetrahydro - 1,4 - ethano-naphthalene (150 mg.) as columnar crystals melting at 199 to 200° C. This product is treated with acetic anhydride in pyridine to give 2-syn,3-syn-bis(acetyloxymethyl)-N-acetyl-9,10-anti-imino-1,2,3,4-tetrahydro - 1,4 - ethano-naphthalene as plates melting at 155.5 to 156.5° C. and 2-syn,3-syn-bis(acetyloxymethyl) - 9,10 - anti-imino-1,2,3,4-tetrahydro-1,4-ethano-naphthalene as plates melting at 124 to 125° C.

Example 6

From 11-hydroxyimino - 9,10 - dihydro - 9,10 - ethano-anthracene (1.68 g.), there is similarly obtained 11,12-imino - 9,10 - dihydro-9,10-ethano-anthracene (0.5 g.) as plates melting at 143 to 145° C. When this product is treated with acetic anhydride, there is obtained N-acetyl-11,12 - imino - 9,10 - dihydro - 9,10 - ethano - anthracene as plates melting at 193 to 195° C. Further, 11,12-imino-9,10-dihydro-9,10-ethano-anthracene is treated with diethyl pyrocarbonate in ether to give N-ethoxycarbonyl-11,12-imino-9,10-dihydro-9,10-ethanoanthracene as crystals melting at 190 to 192° C.

Example 7

From 6-hydroxyimino-6,7-dihydro-5H-dibenzo[a,c]-cycloheptene, there is similarly obtained 5,6-imino-6,7-dihydro-5H-dibenzo[a,c]cycloheptene.2/5 ethylene glycol adduct as needles melting at 95 to 97° C. This product is treated with phenylisocyanate in ether to give N-phenylcarbamoyl - 5,6 - imino - 6,7 - dihydro-5H-dibenzo[a,c] cycloheptene as plates melting at 152 to 153° C.

Example 8

To a suspension of lithium aluminum hydride (1.30 g.) in tetrahydrofuran (70 ml.), there is added dropwise a solution of 1-phenyl-2-hydroxyimino-propane (2.60 g.) in tetrahydrofuran (70 ml.), and the resultant mixture is refluxed for 2 hours. The reaction mixture is treated similarly to give an oily substance (2.8 g.), which is chromatographed on silica gel to give cis-2-methyl-3-phenyl-aziridine (270 mg.) as needles melting at 41 to 43° C. and 2-benzyl-aziridine (120 mg.) as a light yellow oil. The latter product is treated with p-nitrobenzoyl chloride to give 1-(p-nitrobenzoyl)-2-benzyl-aziridine as needles melting at 92.5 to 94.5° C.

Example 9

From 1,3-diphenyl-2-hydroxyiminopropane (500 mg.), there is similarly obtained cis-2-benzyl-3-phenyl-aziridine (437 mg.) as needles melting at 44 to 45° C. The product is treated with phenylisocyanate in ether to give 1-phenylcarbamoyl-cis-2-benzyl-3-phenyl-aziridine as needles melting at 123 to 125° C.

Example 10

From 1,3-diphenyl-2-tosyloxyimino-propane (1.009 g.), there is similarly obtained cis-2-benzyl-3-phenyl-aziridine (57 mg.) as needles melting at 41 to 43° C. This product is treated with phenylisocyanate to give 1-phenylcarbamoyl-cis-2-benzyl-3-phenyl-aziridine as crystals melting at 121 to 124° C.

Example 11

To a suspension of lithium aluminum hydride (640 mg.) in tetrahydrofuran (30 ml.), there is added dropwise a solution of 1,3-diphenyl-2-acetyloxyiminopropane (1.128 g.) in tetrahydrofuran (10 ml.) under cooling at 12° C. and with stirring, and the resultant mixture is refluxed for 3 hours. The reaction mixture is treated similarly to give cis-2-benzyl-3-phenyl-aziridine as an oil, which is treated with phenylisocyanate to give 1-phenylcarbamoyl-cis-2-benzyl-3-phenylaziridine (939 mg.) as crystals melting at 124 to 126° C.

Example 12

From desoxybenzoin oxime (1 g.), there is obtained similarly cis-2,3-diphenyl-aziridine (300 mg.) as plates melting at 83 to 84° C. The product is treated with phenylisocyanate in ether to give 1-phenylcarbamoyl-cis-2,3-diphenylaziridine as crystals melting at 163 to 164° C.

Example 13

From 2-tetralone oxime (1.272 g.), there is obtained similarly 1,2-imino-tetralin (0.473 g.) as needles melting at 52 to 53.5° C. The product is treated with phenylisocyanate in ether to give N-phenylcarbamoyl-1,2-imino-tetralin as crystals melting at 157 to 158° C.

Example 14

From 1,3-diphenyl-2-methoxyiminopropane (1.072 g.), there is obtained similarly cis-2-benzyl-3-phenyl-aziridine as an oil, which is treated with phenylisocyanate in ether to give 1-phenylcarbamoyl-cis-2-benzyl-3-phenyl-aziridine (0.93 g.) as crystals melting at 122 to 123° C.

Example 15

From 1-tetralone oxime (1.0 g.), there is obtained similarly 1,2-imino-tetralin (98 mg.) as crystals melting at 52 to 53° C. The product is treated with phenylisocyanate as crystals melting at 157 to 158° C.

Example 16

From 2-(2-pyridyl)acetophenone oxime (500 mg.), there is obtained similarly cis-2-phenyl-3-(2-pyridyl)-aziridine (85 mg.) as crystals melting at 66 to 67° C. This product is treated with phenylisocyanate in benzene to give 1-phenylcarbamoyl-cis-2-phenyl-3-(2-pyridyl)aziridine (77 mg.) as crystals melting at 161 to 162° C.

Example 17

From acetophenone oxime (30 g.), there is similarly obtained 2-phenylaziridine as an oil boiling at 90.5 to 93° C./10 mm. Hg. The product is treated with phenylisocyanate to give 1-phenylcarbamoyl-2-phenyl-aziridine as crystals melting at 96.5 to 97.5° C. When 2-phenylaziridine is treated with p-nitrobenzoyl chloride, there is obtained 1-(p-nitrobenzoyl)-2-phenylaziridine as crystals melting at 120.5 to 122.5° C.

Example 18

From p-chloroacetophenone oxime (5.005 g.), there is similarly obtained 2-(p-chlorophenyl)-aziridine as an oil. The product is treated with carbon disulfide to give 5-(p-chlorophenyl)-thiazolidine-2-thione as crystals melting at 157 to 158° C.

Example 19

From p-methoxyacetophenone oxime (3.639 g.), there is similarly obtained 2-(p-methoxyphenyl)-aziridine (2.963 g.) as an oil boiling at 90 to 105° C./3 mm. Hg. The product is treated with carbon disulfide to give 5-(p-methoxyphenyl)thiazolidine-2-thione as crystals melting at 140 to 141° C.

Example 20

From 1-(2-naphthyl)-1-hydroxyimino-ethane (2.092 g.), there is similarly obtained 2-(2-naphthyl)-aziridine (309 mg.) as crystals melting at 102.5 to 103.5° C. The product is treated with diethyl pyrocarbonate in ether to give 1-ethoxycarbonyl-2-(2-naphthyl)-aziridine (1.118 g.) as an oil boiling at 130 to 132° C./0.15 mm. Hg. When 2-(2-naphthyl)azirirdine is treated with phenylisocyanate, there is obtained 1-phenylcarbamoyl-2(2-naphthyl)-aziridine as crystals melting at 145 to 146° C.

Example 21

From 1-(1-naphthyl)-1-hydroxyimino-ethane (3.001 g.), there is similarly obtained 2-(1-naphthyl)-aziridine (1.748 g.) as crystals melting at 65 to 67° C. The product is treated with phenylisocyanate to give 1-phenylcarbamoyl-2-(1-naphthyl)-aziridine as crystals melting at 133.5 to 135.0° C.

Example 22

From propiophenone oxime (1.016 g.), there is obtained similarly crude cis-2-methyl-3-phenyl-aziridine (953 mg.) as an oil, which is treated with phenylisocyanate to give 1-phenylcarbamoyl-cis-2-methyl-3-phenyl-aziridine (57 mg.) as crystals melting at 95 to 96° C.

Example 23

To a suspension of lithium aluminum hydride (578 mg.) in tetrahydrofuran (15 ml.), there is added a solution of 1-naphthylacetone oxime (1.51 g.) in tetrahydrofuran (15 ml.), and the resultant mixture is refluxed for 1.5 hours. The reaction mixture is treated similarly to give a mixture of products (1.42 g.), which is chromatographed on silica gel to give cis-2-methyl-3-(1-naphthyl)-aziridine (440 mg.) as crystals melting at 77 to 78° C. and 2-(1-naphthylmethyl)-aziridine (157 mg.) as an oil. The latter product is treated with p-nitrobenzoyl chloride to give 1-(p-nitrobenzoyl)-2-(1-naphthylmethyl)-aziridine as prisms melting at 121.5 to 122.5° C.

Example 24

From 1-(9-phenanthryl)-1-hydroxyiminoethane (1.504 g.), there is similarly obtained 2-(9-phenanthryl)-aziridine (771 mg.) as needles melting at 90 to 91° C. The product is treated with phenylisocyanate to give 1-phenylcarbamoyl-2-(9-phenanthryl)-aziridine as crystals melting at 194 to 196° C.

Example 25

1-phenyl-2-hydroxyiminoethane (1 g.) is treated with lithium aluminum hydride to give 2-phenyl-aziridine (846 mg.) as an oil boiling at 90.5 to 93° C./10 mm. Hg. The product is treated with phenylisocyanate to give 1-phenyl-carbamoyl-2-phenyl-aziridine as crystals melting at 96.5 to 97.5° C.

Example 26

From 1-(4-methoxyphenyl)-2-hydroxyiminoethane (1 g.), there is similarly obtained 2-(4-methoxyphenyl)-aziridine (930 mg.) as an oil. The product is treated with carbon disulfide to give 5-(4-methoxyphenyl)thiazoildine-2-thione as columnar crystals melting at 139 to 140° C.

Example 27

From 1-(4-chlorophenyl)-2-hydroxyiminoethane (500 mg.), there is similarly obtained 2-(4-chlorophenyl)-aziridine (425 mg.) as an oil. The product is treated with carbon disulfide to give 5-(4-chlorophenyl)thiazolidin-2-thione as columnar crystals melting at 157 to 158° C.

Example 28

From 1,1-diphenylacetone oxime (1.6 g.), there is obtained 2-methyl-3,3-diphenyl-aziridine (611 mg.) as prisms melting at 73.5 to 74° C. The product is treated with phenylisocyanate to give 1-phenylcarbamoyl-2-methyl-3,3-diphenylaziridine as needles melting at 148.5 to 150° C.

Example 29

1,3-diphenyl-2-hydroxyimino-propane is treated with lithium aluminum hydride in diglyme similarly to give cis-2-benzyl-3-phenyl-aziridine as crystals melting at 42 to 43° C.

Example 30

1,3-diphenyl-2-hydroxyimino-propane is treated with lithium aluminum hydride in tetrahydropyran similarly to give cis-2-benzyl-3-phenyl-aziridine as crystals melting at 42 to 43° C.

Example 31

11-hydroxyimino - 9,10 - dihydro-9,10-ethano-anthracene is treated with lithium aluminum hydride in dioxane similarly to give 11,12-imino - 9,10 - dihydro-9,10-ethano-anthracene as plates melting at 143 to 145° C.

Example 32

11-hydroxyimino - 9,10 - dihydro-9,10-ethano-anthracene is treated with lithium aluminum hydride in diglyme similarly to give 11,12-imino-9,10-dihydro-9,10-ethano-anthracene as plates melting at 143 to 145° C.

Example 33

From chalcone oxime (497 mg.), there is similarly obtained cis-2-benzyl-3-phenyl-aziridine as crystals melting at 46.5 to 47° C. The yield is 31%.

Example 34

From 10-syn-methoxycarbonyl - 7 - hydroxyimino-5,6,7,8-tetrahydro-6,9-methano-9H-benzocycloheptene (950 mg.), there is obtained 10-syn-hydroxymethyl-7,8-imino-5,6,7,8-tetrahydro-6,9-methano-9H-benzocycloheptene (a mixture of 7,8-syn-imino compound and 7,8-anti-imino compound) (404 mg.). The product is treated with phenylisocyanate to give N-phenylcarbamoyl-10-syn-hydroxymethyl-7,8-imino - 5,6,7,8 - tetrahydro-6,9-methano-9H-benzocycloheptene as needles melting at 198 to 199° C. The said product is treated with acetic anhydride to give N-acetyl-10-syn-acetyloxymethyl - 7,8-imino-5,6,7,8-tetrahydro-6,9-methano-9H-benzocycloheptene as an oil.

Example 35

To a suspension of lithium aluminum hydride (1.741 g.) in tetrahydrofuran (20 ml.), there is added dropwise a solution of 1-(2-naphthyl)-1-hydroxyiminoethane (2.092 g.) in tetrahydrofuran (50 ml.) with cooling, and the resultant mixture is refluxed for 4 hours, chilled below 5° C., mixed with a small amount of water to decompose the excess of lithium aluminum hydride and filtered. The insoluble part is washed with ether. The filtrate is combined with the ethereal washings, the mixture is dried over potassium carbonate, and the solvent is evaporated. The residue is purified by passing through an alumina column to give 2-(2-naphthyl)-aziridine (309 mg.) as crystals melting at 102.5 to 103.5° C.

To a solution of 2-(2-naphthyl)-aziridine (1.006 g.) in ether (20 ml.), there is added a solution of diethyl pyrocarbonate (1.162 g.) in ether (5 ml.). The resultant mixture is allowed to stand at room temperature for 4 hours. After evaporation of the ether, the residue is distilled to give 1-ethoxycarbonyl-2-(2-naphthyl)-aziridine (1.118 g.) as an oil boiling at 130 to 132° C./0.15 mm. Hg.

Example 36

To a suspension of lithium aluminum hydride (4.4 g.) in tetrahydrofuran (100 ml.), there is added dropwise a solution of diethylamine (8.5 g.) in tetrahydrofuran (10 ml.) and the resultant mixture is stirred for an hour. A solution of 6-acetyltetralin oxime (5.0 g.) in tetrahydrofuran (50 ml.) is added dropwise to the mixture, which is refluxed for 5 hours. The reaction mixture is mixed with a small amount of water to decompose the excess of lithium aluminum hydride and filtered. The insoluble part is washed with ether. The filtrate is combined with the ethereal washings, dried over potassium carbonate and the solvent is evaporated to give an oily residue (4.5 g.). The residue is purified by passing through an alumina column to give 6-(2-aziridinyl)-tetralin (2.914 g.) as a colorless oil boiling at 135 to 136° C./5 mm. Hg.

The product is treated with p-nitrobenzoyl chloride to give 6-[1-(p-nitrobenzoyl)-aziridin-2-yl]-tetralin as crystals melting at 111 to 112° C.

Example 37

A solution of 1-(6-chloro-2-naphthyl)-1-hydroxyiminoethane (2.09 g.) in tetrahydrofuran (112 ml.) is refluxed for an hour, and the reaction mixture is mixed with a small amount of water and filtered. The filtrate is evaporated under reduced pressure and the residue is purified by passing through an alumina column to give 2-(6-chloro-2-naphthyl)-aziridine as crystals melting at 147 to 148° C. The yield is 51%.

Example 38

A solution of 2-(2-naphthyl)-1-hydroxyiminoethane (93 mg.), N-methyl-n-butylamine (130 mg.) and lithium aluminum hydride (57 mg.) in tetrahydrofuran (5 ml.) is heated at 60° C. for 4 hours in a closed tube, and the reaction mixture is mixed with a small amount of water to decompose the excess of lithium aluminum hydride. The mixture is filtered, and the filtrate is chromatographed in gas phase. There is obtained 2-(2-naphthyl)-aziridine as crystals melting at 102.5 to 103.5° C. The yield is 73%.

Example 39

From 3,5-diphenyl-2-isoxazoline, there is similarly obtained cis-2-benzyl-3-phenyl-aziridine as crystals melting at 42 to 43° C. in 31% yield.

Example 40

From 3-phenyl-2-isoxazoline, there is similarly obtained cis-2-methyl-3-phenyl-aziridine as crystals melting at 41 to 43° C. in 36% yield.

Example 41

From benzalacetone oxime, there is similarly obtained cis-2-benzyl-3-methyl-aziridine as an oil. The yield is 33%. The product is treated with p-nitrobenzoyl chloride to give 1-(p-nitrobenzoyl)-cis-2-benzyl-3-methyl-aziridine as crystals melting at 115 to 115.5° C.

Example 42

From phenyl vinyl ketoxime, there is similarly obtained cis-2-methyl-3-phenyl-aziridine as crystals melting at 41 to 43° C. The yield is 50%.

Example 43

α-Phenylchalcone oxime is treated with lithium aluminum hydride at 40° C. similarly to give 2-benzyl-2,3-diphenyl-aziridine as crystals melting at 85.5 to 86° C. The yield is 86%.

Example 44

Phenyl α-styryl ketoxime is treated with lithium aluminum hydride at 10° C. similarly to give 2-methyl-2,3-diphenyl-aziridine as crystals melting at 58.5 to 59° C. The yield is 90%.

Example 45

3-methyl-trans-4,5-diphenyl-2-isoxazoline is treated with lithium aluminum hydride at 35 to 40° C. similarly to give 2-benzyl-2-phenyl-3-methyl-aziridine as crystals melting at 35 to 40° C. The yield is 70%.

Example 46

To a suspension of lithium aluminum hydride (750 mg.) in tetrahydrofuran (20 ml.), there is added a solution of 2-naphthylacetone oxime (1.70 g.) in tetrahydrofuran (40 ml.), and the resultant mixture is stirred for 1.5 hours. The reaction mixture is treated similarly to give an oily residue (1.6 g.), which is chromatographed on silica gel to give cis-2-methyl-3-(2-naphthyl)-aziridine (410 mg.) as needles melting at 83 to 84° C. and 2-(2-naphthylmethyl)-aziridine (150 mg.) as an oil. The latter product is treated with p-nitrobenzoyl chloride to give 1-(p-nitrobenzoyl)-2-(2-naphthylmethyl)-aziridine as crystals melting at 94.5 to 95.5° C.

What is claimed is:

1. Process for preparing aziridine derivatives which comprises reducing an oximine compound represented by the formula

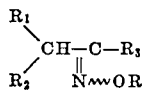

wherein the moiety

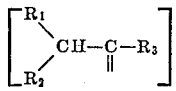

contains up to 16 carbon atoms and R represents hydrogen, lower alkyl, aryl, ar(lower alkyl) or acyl, each of $R_1$, $R_2$ and $R_3$ represent hydrogen or lower alkyl, cycloalkyl, aryl, aralkyl, alkenyl or aralkenyl, or 2 members of R, $R_1$, $R_2$, and $R_3$ form a hydrocarbon ring system, and wherein the aryl, aralkyl or aralkenyl groups are either unsubstituted or contain one substituent selected from the group consisting of lower alkyl, lower alkoxy, hydroxy, lower alkylthio, halogen, lower alkylamino, di(lower) alkyl amino and amino, and the ripple mark ∿∿∿∿∿ is a generic indication of both syn and anti forms, with a hydride selected from the group consisting of lithium aluminum hydride, magnesium aluminum hydride and sodium aluminum hydride in an inert solvent to give an aziridine compound represented by the formula

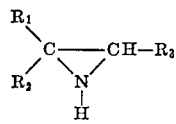

wherein $R_1$, $R_2$ and $R_3$ are defined as above.

2. Process according to claim 1, in which the reduction is effected in the range of temperature from 0° C. to the boiling point of the solvent used.

3. Process according to claim 1, in which the reduction is effected in tetrahydrofuran.

4. Process according to claim 1, in which the metallic hydride complex is lithium aluminum hydride.

5. Process according to claim 1, in which the reduction is effected in the presence of a compound selected from the group consisting of tert-pentylamine, n-propylamine, sec-octylamine, diethylamine, N-ethyl-n-propylamine, N-methyl-n-butylamine, pyrrolidine, piperazine, N-methyl-benzylamine or N-ethyl-β-phenylethylamine.

6. Process according to claim 1, in which said aziridine compound is 2-(2-naphthyl)aziridine.

References Cited

Weissberger: Chemistry of Heterocyclic Compounds, vol. 19, part one, (New York, 1964), pp. 537–528.

ALTON D. ROLLINS, Primary Examiner

U.S. Cl. X.R.

260—240 F, 240 K, 296 R, 296 M, 306.7, 469, 475 FR, 566 A, 566 AE